United States Patent
Huang et al.

(10) Patent No.: US 10,270,615 B2
(45) Date of Patent: Apr. 23, 2019

(54) METHOD OF PROVIDING OPERATING OPTIONS OF AN ELECTRIC APPLIANCE

(71) Applicant: GRAND MATE CO., LTD., Taichung (TW)

(72) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Yen-Jen Yeh, Taichung (TW);
Kuan-Chou Lin, Taichung (TW);
Yu-Chin Tsai, Taichung (TW)

(73) Assignee: GRAND MATE CO., LTD., Taichung (TW)

(*) Notice: Subject to any disclaimer, the term of this patent is extended or adjusted under 35 U.S.C. 154(b) by 172 days.

(21) Appl. No.: 14/586,064

(22) Filed: Dec. 30, 2014

(65) Prior Publication Data
US 2016/0191270 A1 Jun. 30, 2016

(51) Int. Cl.
*H04L 12/28* (2006.01)
*H04W 40/22* (2009.01)

(52) U.S. Cl.
CPC ...... *H04L 12/2834* (2013.01); *H04L 12/2816* (2013.01); *H04L 12/2818* (2013.01); *H04W 40/22* (2013.01); *H04L 2012/2841* (2013.01)

(58) Field of Classification Search
CPC .... H04L 12/2834; H04W 40/22; H04W 76/02
USPC ...................................... 709/227
See application file for complete search history.

(56) References Cited

U.S. PATENT DOCUMENTS

| | | | | |
|---|---|---|---|---|
| 2001/0021884 A1* | 9/2001 | Shinyagaito | ........ | H04L 12/2803 700/275 |
| 2002/0062338 A1* | 5/2002 | McCurley | ............... | H04L 29/06 709/203 |
| 2002/0178398 A1* | 11/2002 | Sekiguchi | ................. | H04L 1/22 714/4.3 |
| 2009/0237245 A1* | 9/2009 | Brinton | .................. | G07C 5/008 340/540 |
| 2010/0066507 A1* | 3/2010 | Myllymaki | ............. | G06F 21/31 340/10.4 |
| 2011/0131521 A1* | 6/2011 | Cho | ........................ | G06F 3/016 715/772 |
| 2011/0214162 A1* | 9/2011 | Brakensiek | ......... | G06F 21/6218 726/4 |
| 2012/0134308 A1* | 5/2012 | Yamada | .............. | H04L 12/2834 370/310 |

(Continued)

*Primary Examiner* — Michael A Keller
*Assistant Examiner* — Jsing Forng Lin
(74) *Attorney, Agent, or Firm* — Lynette Wylie; Apex Juris, PLLC.

(57) ABSTRACT

A method of providing operating options of an electric appliance is applied in a wireless system, which includes a portable device, an electric appliance, and a relay apparatus. The portable device and the relay apparatus are connected to each other within either a near-end network or a far-end network. The electric appliance communicates with the relay apparatus, and has a plurality of operating options which can be selected to operate the electric appliance. If the portable device and the relay apparatus are connected within the near-end network, all of the operating options are displayed on the portable device for selection; if it's within the far-end network, a part of the operating options are disabled on the portable device for selection.

4 Claims, 3 Drawing Sheets

(56) References Cited

U.S. PATENT DOCUMENTS

| | | | |
|---|---|---|---|
| 2013/0111579 A1* | 5/2013 | Newman | G06F 3/0488 |
| | | | 726/17 |
| 2013/0179593 A1* | 7/2013 | Dunlap | H04L 45/42 |
| | | | 709/244 |
| 2014/0215065 A1* | 7/2014 | Fisher | H04L 12/281 |
| | | | 709/224 |
| 2014/0233374 A1* | 8/2014 | Elliott | H04W 48/16 |
| | | | 370/228 |
| 2015/0004938 A1* | 1/2015 | Nagata | H04M 1/67 |
| | | | 455/411 |
| 2015/0088287 A1* | 3/2015 | Nagamatsu | H04L 12/2818 |
| | | | 700/90 |
| 2015/0110098 A1* | 4/2015 | Zhang | H04L 12/2834 |
| | | | 370/338 |
| 2015/0120000 A1* | 4/2015 | Coffey | H04L 12/2803 |
| | | | 700/13 |
| 2016/0020918 A1* | 1/2016 | Lu | G05B 15/02 |
| | | | 700/275 |
| 2016/0066352 A1* | 3/2016 | Yang | H04W 40/02 |
| | | | 370/329 |
| 2016/0088146 A1* | 3/2016 | Ying | H04M 1/72569 |
| | | | 455/550.1 |
| 2016/0259955 A1* | 9/2016 | Berlin | G06Q 30/02 |
| 2017/0126689 A1* | 5/2017 | Lloyd | H04L 63/102 |
| 2017/0295288 A1* | 10/2017 | Nishii | H04N 1/00973 |

* cited by examiner

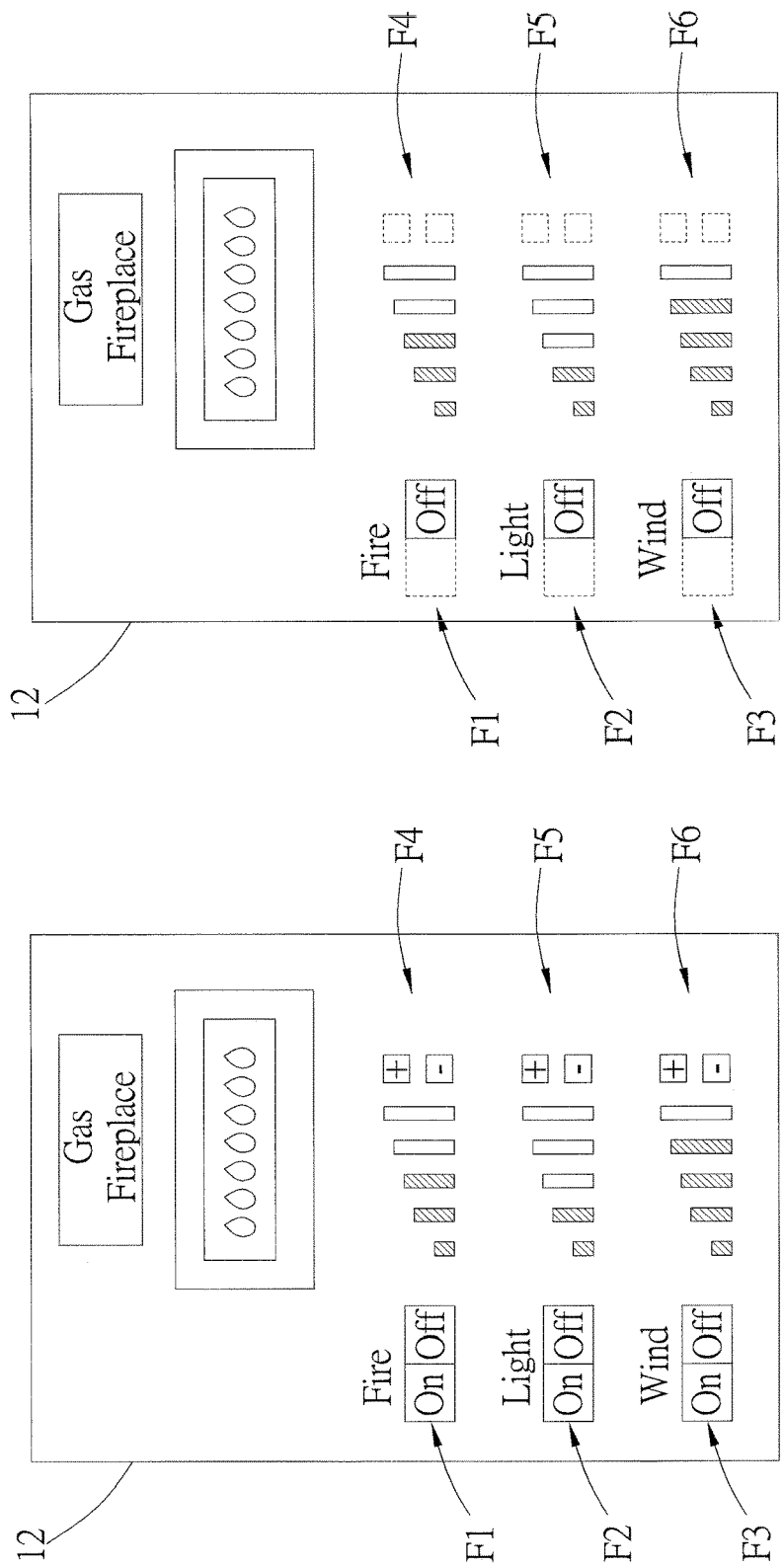

METHOD OF PROVIDING OPERATING OPTIONS OF AN ELECTRIC APPLIANCE

BACKGROUND OF THE INVENTION

1. Technical Field

The present invention relates generally to methods of controlling electric appliances, and more particularly to a method of providing operating options of an electric appliance for users to select one therefrom.

2. Description of Related Art

The number of electric appliances in a modern home shows a rising trend in the recent decades. For convenience of usage, many electric appliances such as TVs, air conditioners, anti-theft systems, water heaters, and gas fireplaces, are respectively paired with a remote control. However, with the increase of the number and types of electric appliances, naturally, there would be more and more remote controls in one home, which may confuse users, and sometimes may even cause accidents if one electric appliance is operated unexpectedly.

In light of this, some manufacturers of electric appliances have provided one kind of relay apparatus, which allows a user to control electric appliances with a portable device (e.g., tablet computer, smartphone, or PDA). More specifically, a user can input control commands with a portable device which has established communication with such a relay apparatus through wireless network, and the inputted control commands are then transmitted to the relay apparatus to be converted into corresponding control signals. After that, the relay apparatus transmits the control signals to designated electric appliances to perform certain operations. In this way, a user is able to use only one portable device to control multiple electric appliances, which solves the problem of having too many remote controls.

However, the aforementioned architecture has a potential defect. A user can control electric appliances back home even when the user himself is absent, as long as the portable device held by the user can communicate with the relay apparatus through far-end network. In such case, the user may unintentionally turn on some home appliances to waste energy or even to cause unexpected danger.

BRIEF SUMMARY OF THE INVENTION

In view of the above, the primary objective of the present invention is to provide a method of providing operating options of an electric appliance, which provides more selectable operating options when the portable device and the relay apparatus communicate with each other through a near-end network than the situation that through a far-end network.

The present invention provides a method of providing operating options of an electric appliance, wherein the method is applied in a wireless system, which includes a portable device, the electric appliance, and a relay apparatus, wherein the portable device and the relay apparatus are connected through either a near-end network or a far-end network; the electric appliance communicates with the relay apparatus; the electric appliance provides a plurality of operating options which can be selected to operate the electric appliance. The method includes the steps of: A) establishing a network connection between the portable device and the relay apparatus; and B) determining whether the network connection is within the near-end network or the far-end network. If the network connection is within the near-end network, all of the operating options of the electric appliance are displayed on the portable device for selection; if the network connection is within the far-end network, a part of the operating options of the electric appliance are disabled on the portable device for selection.

With the method, when the portable device is not far away from the relay apparatus and therefore able to communicate with the relay device through a near-end network, there are more operating options of the electric appliance provided for a user to select one therefrom. Otherwise, the portable device has to communicate with the relay apparatus through a far-end network, and under such condition, part of the operating options are set as not selectable to lower the risk of misusing the electric appliance.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 3 is a diagram showing the user interface of the smartphone to control the gas fireplace through the near-end network;

FIG. 4 is a diagram showing the user interface of the smartphone to control the gas fireplace through the far-end network.

DETAILED DESCRIPTION OF THE INVENTION

Figure 1:
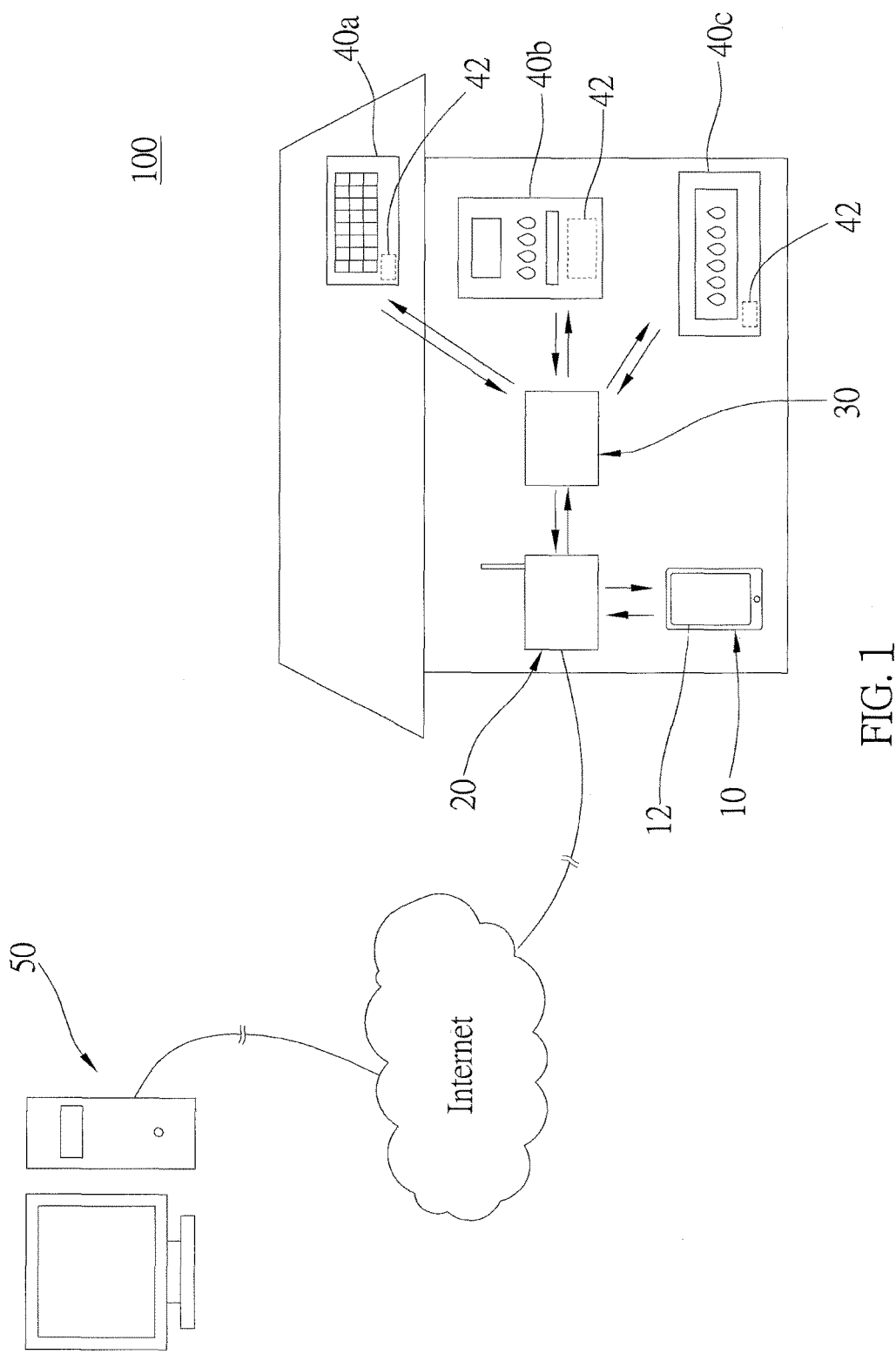
FIG. 1 is a schematic diagram of the wireless system of a preferred embodiment of the present invention.

The present application provides a method of providing operating options of an electric appliance, and as shown in FIG. 1, a wireless system 100 of the first preferred embodiment of the present invention which applies the method includes a portable device, which is a smartphone 10 as an example, an access point (AP) 20, a signal converter 30, a server 50, and a plurality of electric appliances, which are an air conditioner 40a, a gas fireplace 40b, and a gas water heater 40c as examples.

The smartphone 10 and the AP 20 mutually communicate with each other through network connection, and the network connection established therebetween is within either a near-end network or a far-end network. More specifically, for the near-end network referred herein, the smartphone 10 communicates with the AP 20 directly through Wi-Fi signals. As for the far-end network, the smartphone 10 communicates with the AP 20 through Internet. In the preferred embodiment, the server 50 is further provided to communicate the smartphone 10 and the AP 20 through Internet, and such indirect network connection is also considered within the far-end network.

The AP 20 and the signal converter 30 together constitute a relay apparatus located at a user end to transmit and convert signals between the smartphone 10 and the electric appliances.

Figure 2:
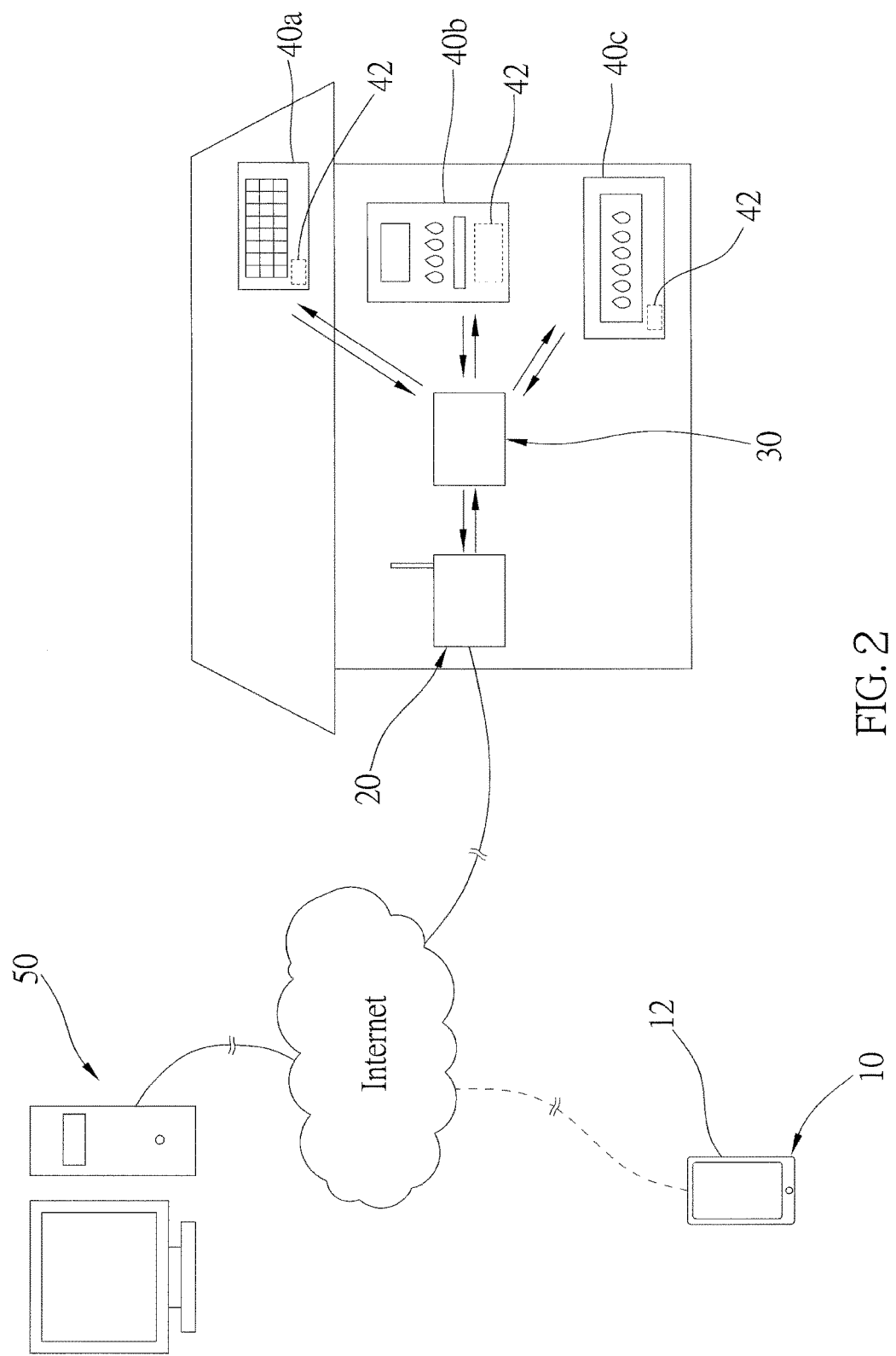
FIG. 2 is a schematic diagram of the wireless system of the preferred embodiment of the present invention, wherein the smartphone is located far from the relay apparatus.

The AP 20 performs dynamic host configuration protocol (DHCP) to dynamically assign IP addresses. In this way, if the smartphone 10 directly communicates with the AP 20 through Wi-Fi signals (i.e., within the near-end network), the AP 20 assigns an Intranet IP address to the smartphone 10. On the other hand, as shown in FIG. 2, if the smartphone 10 communicates with the AP 20 through Internet (i.e., within the far-end network), the IP address assigned to the smartphone is different from the Intranet IP address assigned by the AP 20.

The signal converter 30 and the AP 20 communicate with each other through Wi-Fi signals, and therefore the smartphone 10 is also able to indirectly communicate with the signal converter 30, wherein the signal converter 30 has the ability to convert Wi-Fi signals into RF signals, and vice versa.

Each electric appliance has a controller 42, which communicates with the signal converter 30 through RF signals. In addition, each electric appliance provides a plurality of operating options for users to select. Each controller 42 is stored with an ID code of the belonging electric appliance, wherein the ID code contains information such as model, serial number, etc. Every ID code is, of course, different from others, and whereby the electric appliances can be identified.

The smartphone 10 is installed with an application to control the electric appliances. Before the smartphone 10 executes the application for the first time, the smartphone 10 has to establish a direct network connection with the AP 20 through Wi-Fi signals first, and to have the Intranet IP address assigned by the AP 20. After the connection is established, the application reminds the user to save the Intranet settings into the smartphone 10, since the related information can be used as evidence proving the network connection is within the near-end network. Whereby, every time the smartphone 10 establishes a network connection with the AP 20, the application can easily determine whether it is within the near-end network or the far-end network. In more details, if the IP addresses of the smartphone 10 and the AP 20 are both addresses of an Intranet, then the network connection is within the near-end network. Otherwise, it's within the far-end network.

In addition, the signal converter 30 provides an appliance list to the smartphone 10 to be displayed on a screen 12 thereof. A user is able to operate and/or control one of the electric appliances by selecting the corresponding item from the appliance list shown on the screen 12, and after one item is selected, the corresponding ID code and control commands are transmitted to the AP 20 through Wi-Fi signals. The Wi-Fi signals are then transmitted from the AP 20 to the signal converter 30 to be converted into RF signals, and finally received by the controller 42 of the electric appliance corresponding to the ID code. Whereby, the selected electric appliance can be controlled to perform certain operations such as turning on, turning off, adjusting outputs, etc., according to the control commands. Also, the controller 42 transmits RF signals which contain operation information of the belonging electric appliance to the signal converter 30, wherein the operation information may include the status of on or off, output power, and abnormal messages, etc. The RF signals are converted into Wi-Fi signals by the signal converter 30, and then transmitted to the smartphone 10 via the AP 20.

Take the control of the gas fireplace 40*b* for example, if the application determines the network connection established between the smartphone 10 and the AP 20 is within the near-end network, and the user selects the item corresponding to the gas fireplace 40*b* from the appliance list, a user interface as FIG. 3 is shown on the screen 12. The current operation status of the gas fireplace 40*b*, such as fire intensity, light, and wind speed, can be displayed on the screen 12 for the user's reference. Furthermore, there are several selectable operating options F1-F6 shown thereon, wherein the operating options F1-F3 respectively relate to switching on or off of the fire, the light, and the wind of the gas fireplace 40*b*, while the operating options F4-F6 respectively relate to adjusting the output power of these functions.

On the other hand, if the application determines the network connection is within the far-end network, the user sees the user interface as FIG. 4, on which the operation status of the gas fireplace 40*b* can be still seen, but the operating options F1-F3 cannot be selected to switch on fire, light, and wind of the gas fireplace 40*b*; as for the operating options F4-F6 relating to adjust output power, they are now displayed in dotted lines, which means these operating options F4-F6 are disabled and not selectable. In other words, though the operating options F1-F3 are selectable, a user is only allowed to switching off fire, light, or wind of the gas fireplace 40*b* by selecting these operating options F1-F3. Therefore, when under this condition, a user can neither directly switch on any function of the gas fireplace 40*b* as described above, nor adjusting the output power; the only allowed operation is to switching off fire, light, or wind of the gas fireplace 40*b*.

The practice of controlling the air conditioner 40*a* or the gas water heater 40*c* is similar to that of the gas fireplace 40*b*, and is not described in detail herein.

Though it's the smartphone 10 in charge to determine the type of the network connection in the preferred embodiment, the relay apparatus can also play the role to do the job in practice. In such case, the IP address of the smartphone 10 is transmitted to the signal converter 30 by the AP 20 after the network connection between the smartphone 10 and the AP 20 is established, and the signal converter 30 determines whether the IP address of the smartphone 10 belongs to the same Intranet or not. If yes, the signal converter 30 transmits a confirm message to the smartphone 10, and the application displays all operating options accordingly; otherwise, the signal converter 30 transmits a list which elaborates all restricted operating options of every electric appliance to the smartphone 10, and the application disables a part of the operating options based on the list. Whereby, when the network connection is within the far-end network, users are only allowed to select a certain part of the operating options for every electric appliance.

It is worth mentioning that, the controller 42 of each electric appliance not only passively receives messages sent from the relay apparatus, but also automatically transmits the operation status of the belonging electric appliance to the relay apparatus. The operation status is uploaded to the server 50 by the relay apparatus through Internet, and then stored there. Since the server 50 keeps receiving the operation status of each electric appliance, the electric appliances can be monitored in this way. Whereby, if the smartphone 10 and the relay apparatus are disconnected and the operation status of any electric appliance is changed, the server 50 immediately sends a notify message to the smartphone 10 to inform the user, wherein the notify message can be sent through SMS or MMS.

With the method provided in the present invention, the safety for users to control electric appliances from far away is effectively ensured. When the network connection is with the far-end network, a user is prevented from misusing electric appliances. However, a user can still see the operation status of the electric appliances at home.

In another embodiment, it may be up to users to further decide which operating options of each electric appliance should be disabled when under the condition of far-end network. For example, a user may decide to only restrict the operating option of switching on fire of the gas fireplace 40*b*, and leave other operating options unrestricted. When the gas fireplace 40b and the signal converter 30 are connected, the controller 42 of the gas fireplace 40b transmits the user-decided setting (i.e., only preventing users at far from switching on fire) to the signal converter 30. If the smartphone 10 and the relay apparatus are connected within the far-end network, such setting is transmitted to the smartphone 10, and then the smartphone 10 renders the user interface accordingly to disable the operating option of switching on fire of the gas fireplace 40b. In this way, while ensuring the safety of use, users can have more flexibility to operate the electric appliances.

It must be pointed out that the embodiments described above are only some preferred embodiments of the present invention. All equivalent methods which employ the concepts disclosed in this specification and the appended claims should fall within the scope of the present invention.

What is claimed is:

1. A method of providing operating options of an electric appliance, wherein the method is applied in a wireless system, which includes a portable device, the electric appliance, and a relay apparatus, wherein the portable device and the relay apparatus are connected through either a near-end network or a far-end network; the electric appliance communicates with the relay apparatus; the electric appliance provides a plurality of operating options which can be selected to operate the electric appliance; comprising the steps of:
   A. establishing a network connection between the portable device and the relay apparatus;
   B. determining whether the network connection is within the near-end network or the far-end network;
   if the network connection is within the near-end network, all of the operating options of the electric appliance are displayed on the portable device to be selected by a user;
   if the network connection is within the far-end network, a part of the operating options of the electric appliance are disabled on the portable device for selection, while another part of the operating options of the electric appliance is still selectable on the portable device; and
   in step B, if IP addresses of the portable device and the relay apparatus are in a same Intranet, the network connection is determined within the near-end network;
   wherein the method further comprises a step of making a list of restricted operating options before step A, and if the network connection is within the far-end network, a part of the operating options is disabled for selection on the portable device according to the list of the restricted operating options in step B;
   wherein the portable device has a screen to display the operating options of the electric appliance;
   wherein if the network connection is within the far-end network, the relay apparatus transmits a list which elaborates which ones among the operating options should be disabled to the portable device, and the portable device disables a part of the operating options according to the list, and the user is not allowed to select the restricted operating options.

2. The method of claim 1, wherein, the portable device determines the network connection is within the near-end network in step B.

3. The method of claim 1, wherein in the relay apparatus determines the network connection is within the near-end network in step B.

4. The method of claim 1, wherein the wireless system includes a server which communicates with the relay apparatus through network, and the relay apparatus transmits an operation status of the electric appliance to the server; the method further includes a step of sending a notify message to the portable device when the portable device and the relay apparatus are disconnected and the operation status of the electric appliance changes.

* * * * *